(12) United States Patent
Buchter et al.

(10) Patent No.: US 12,431,125 B2
(45) Date of Patent: Sep. 30, 2025

(54) KEYWORD DETECTION

(71) Applicant: Comcast Cable Communications, LLC, Philadelphia, PA (US)

(72) Inventors: Christian Buchter, Philadelphia, PA (US); Scott Kurtz, Mount Laurel, NJ (US); Michael Sallas, Radnor, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 248 days.

(21) Appl. No.: 17/193,761

(22) Filed: Mar. 5, 2021

(65) Prior Publication Data

US 2022/0284883 A1  Sep. 8, 2022

(51) Int. Cl.
| | | |
|---|---|---|
| *G10L 15/22* | (2006.01) | |
| *G10L 15/08* | (2006.01) | |
| *G10L 15/20* | (2006.01) | |

(52) U.S. Cl.
CPC .............. *G10L 15/08* (2013.01); *G10L 15/20* (2013.01)

(58) Field of Classification Search
CPC .......... G06F 3/165; G06F 3/167; G06F 13/08; G06F 16/24522; G06F 3/013; G10L 25/78; G10L 15/222; G10L 15/22; G10L 2015/223; G10L 2015/088
See application file for complete search history.

(56) References Cited

U.S. PATENT DOCUMENTS

| | | | | |
|---|---|---|---|---|
| 10,192,546 B1* | 1/2019 | Piersol | ................... | G10L 15/08 |
| 10,303,658 B2* | 5/2019 | Abbott | ................. | G06F 16/176 |
| 10,365,887 B1* | 7/2019 | Mulherkar | .............. | G06F 3/167 |
| 10,461,712 B1* | 10/2019 | Yang | ....................... | G06F 3/165 |
| 10,649,727 B1* | 5/2020 | Douglas | .................. | H04L 67/34 |
| 11,183,181 B2* | 11/2021 | Hartung | .................. | G10L 25/51 |
| 11,410,638 B1* | 8/2022 | Bhatnagar | ............... | G10L 13/00 |
| 11,693,622 B1* | 7/2023 | Elders | ..................... | G06F 3/167 |
| | | | | 704/257 |
| 12,181,847 B1* | 12/2024 | Brett | ...................... | G06N 20/00 |
| 2003/0139924 A1* | 7/2003 | Balasuriya | ............. | G10L 15/30 |
| | | | | 704/E15.047 |
| 2005/0108249 A1* | 5/2005 | Schalk | ................... | G06Q 30/02 |
| 2010/0146445 A1* | 6/2010 | Kraut | ..................... | G06F 3/162 |
| | | | | 700/94 |
| 2012/0008800 A1* | 1/2012 | Goerke | .................... | H03G 3/32 |
| | | | | 381/104 |
| 2012/0257761 A1* | 10/2012 | Kumar | ................. | H03G 3/3005 |
| | | | | 381/57 |
| 2014/0133676 A1* | 5/2014 | Ito | ............................ | H03F 1/52 |
| | | | | 381/107 |
| 2014/0310002 A1* | 10/2014 | Nitz | ....................... | G10L 15/22 |
| | | | | 704/270.1 |
| 2014/0310316 A1* | 10/2014 | Coburn, IV | .......... | G06F 16/639 |
| | | | | 707/799 |
| 2015/0006176 A1* | 1/2015 | Pogue | .................... | G10L 15/22 |
| | | | | 704/249 |

(Continued)

*Primary Examiner* — Jakieda R Jackson (74) *Attorney, Agent, or Firm* — Banner & Witcoff, Ltd.

(57) ABSTRACT

Systems, apparatuses, and methods are described for keyword detection. A first detector device may receive audio and process the audio to determine a confidence value regarding presence of a keyword. A copy of the audio may be passed to a second detector device to perform additional testing for the audio. The first detector device may take an action before or after sending to the second detector device based on the confidence value.

20 Claims, 5 Drawing Sheets

(56) References Cited

U.S. PATENT DOCUMENTS

| | | | |
|---|---|---|---|
| 2015/0163610 A1* | 6/2015 | Sampat | G10L 17/22 381/58 |
| 2016/0098393 A1* | 4/2016 | Hebert | G06F 40/40 704/9 |
| 2016/0155443 A1* | 6/2016 | Khan | G06F 3/167 704/275 |
| 2016/0217790 A1* | 7/2016 | Sharifi | G10L 15/285 |
| 2016/0373269 A1* | 12/2016 | Okubo | H04L 12/282 |
| 2017/0103754 A1* | 4/2017 | Higbie | G06F 3/165 |
| 2017/0133011 A1* | 5/2017 | Chen | G10L 25/78 |
| 2017/0245076 A1* | 8/2017 | Kusano | H04R 3/00 |
| 2017/0323645 A1* | 11/2017 | Edara | G10L 17/22 |
| 2018/0027127 A1* | 1/2018 | Mese | H04W 4/80 455/420 |
| 2018/0061419 A1* | 3/2018 | Melendo Casado | G10L 25/78 |
| 2018/0108351 A1* | 4/2018 | Beckhardt | G10L 15/32 |
| 2018/0190308 A1* | 7/2018 | Lou | H04R 3/005 |
| 2018/0341643 A1* | 11/2018 | Alders | G10L 15/1822 |
| 2018/0353128 A1* | 12/2018 | Farrell | A61B 5/4542 |
| 2018/0358009 A1* | 12/2018 | Daley | G06F 3/167 |
| 2019/0013019 A1* | 1/2019 | Lawrence | G10L 15/1815 |
| 2019/0053756 A1* | 2/2019 | Ayers | A61B 5/4809 |
| 2020/0013407 A1* | 1/2020 | Chae | G06F 3/167 |
| 2020/0045403 A1* | 2/2020 | Ganeshkumar | H04R 1/406 |
| 2020/0103963 A1* | 4/2020 | Kelly | G06F 3/165 |
| 2020/0175986 A1* | 6/2020 | Jones | G10L 15/1815 |
| 2020/0184962 A1* | 6/2020 | Chen | G10L 15/08 |
| 2020/0184971 A1* | 6/2020 | Kudo | G01C 21/3629 |
| 2020/0319841 A1* | 10/2020 | Wagatsuma | G06F 3/14 |
| 2020/0349925 A1* | 11/2020 | Shahid | G10L 15/08 |
| 2020/0395010 A1* | 12/2020 | Smith | G10L 15/22 |
| 2021/0091971 A1* | 3/2021 | Keohane | H04L 12/2829 |
| 2021/0249004 A1* | 8/2021 | Smith | G10L 15/22 |
| 2021/0255971 A1* | 8/2021 | Kim | G06F 3/0659 |
| 2021/0295833 A1* | 9/2021 | Rastrow | G10L 15/26 |
| 2021/0366476 A1* | 11/2021 | Smith | G06F 3/167 |
| 2021/0390948 A1* | 12/2021 | Shah | G10L 15/065 |
| 2022/0179936 A1* | 6/2022 | Weksler | B60W 50/12 |
| 2022/0180865 A1* | 6/2022 | Kwatra | G10L 15/20 |
| 2022/0189469 A1* | 6/2022 | Carbune | G10L 15/16 |
| 2022/0277727 A1* | 9/2022 | Mixter | G10L 15/26 |

* cited by examiner

| Setting | Value |
|---|---|
| Sensitivity | 3 |
| Keyword accept threshold | 0.7 |
| Audio signal gain | 0.3 |
| Active beams | 1,2,5 |
| Language | English |
| Accent | New York |

FIG. 4

FIG. 5

KEYWORD DETECTION

BACKGROUND

Features described herein relate to detecting keywords or phrases in audio, such as for voice commands.

SUMMARY

The following summary presents a simplified summary of certain features. The summary is not an extensive overview and is not intended to identify key or critical elements.

Systems, apparatuses, and methods are described for keyword detection in a system in which a first detector device and a second detector device may be used to determine the presence of a keyword in audio. The first detector device may receive audio and process the audio to determine a confidence value regarding presence of a keyword. A copy of the audio may be passed to the second detector device (which may have more processing power than the first detector device) to perform additional testing for the audio. The first detector device may take an action before or after sending to the second detector device based on the confidence value (e.g., the first detector device may only mute a television to better listen for commands if it has a high confidence value that a keyword was in the audio, else it may wait for the second detector device to confirm presence of the keyword in the audio before muting).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

The accompanying drawings, which form a part hereof, show examples of the disclosure. It is to be understood that the examples shown in the drawings and/or discussed herein are non-exclusive and that there are other examples of how the disclosure may be practiced.

Figure 1:
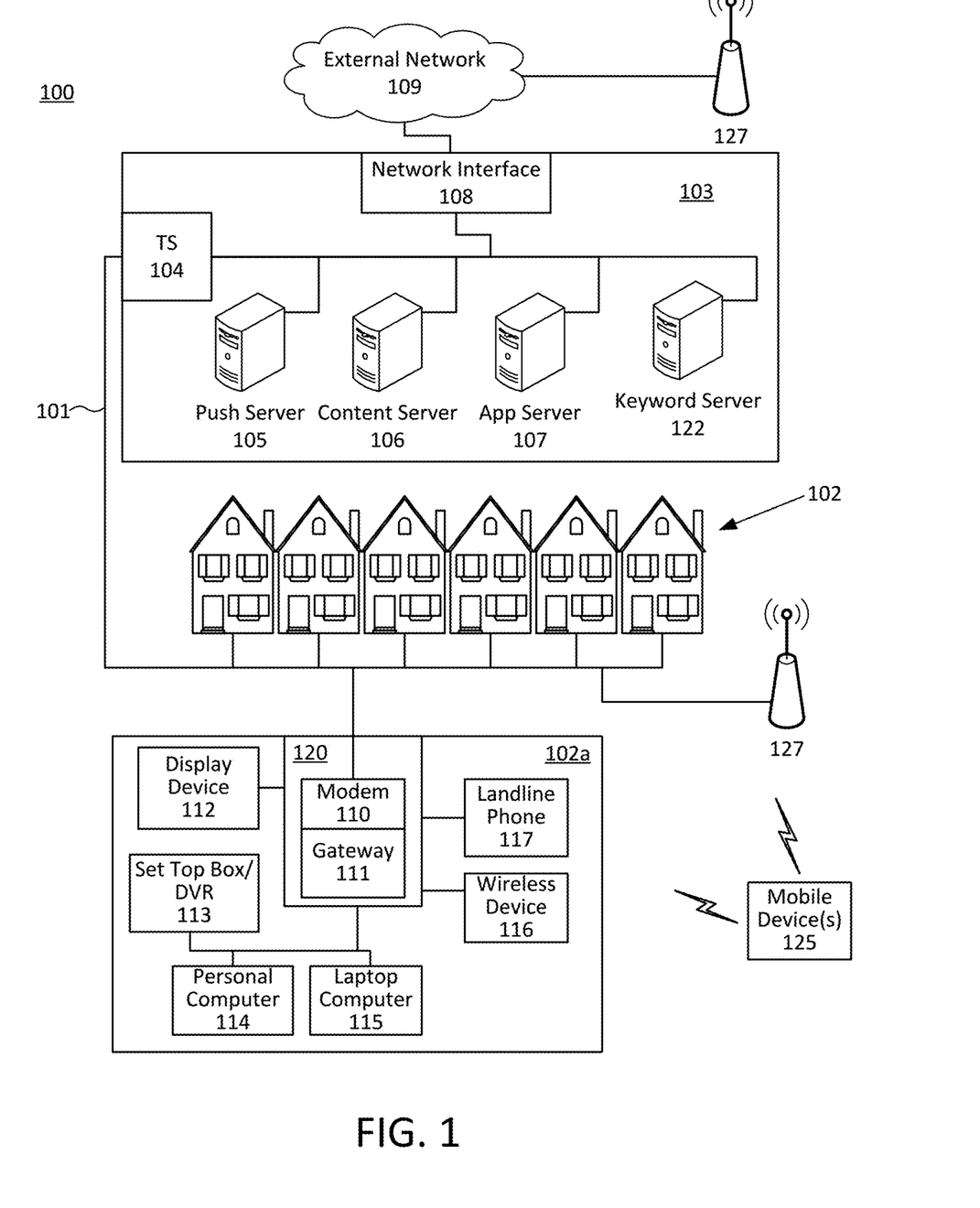
FIG. 1 shows an example communication network.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as a keyword server 122 (described below) that can process audio and identify the presence of one or more keywords or phrases in the audio, and can support keyword detection capabilities of a local device at a user premises. Additional servers may include, additional push, content, and/or application servers, and/or other types of servers. Although shown separately, the push server 105, the content server 106, the application server 107, the keyword detector server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
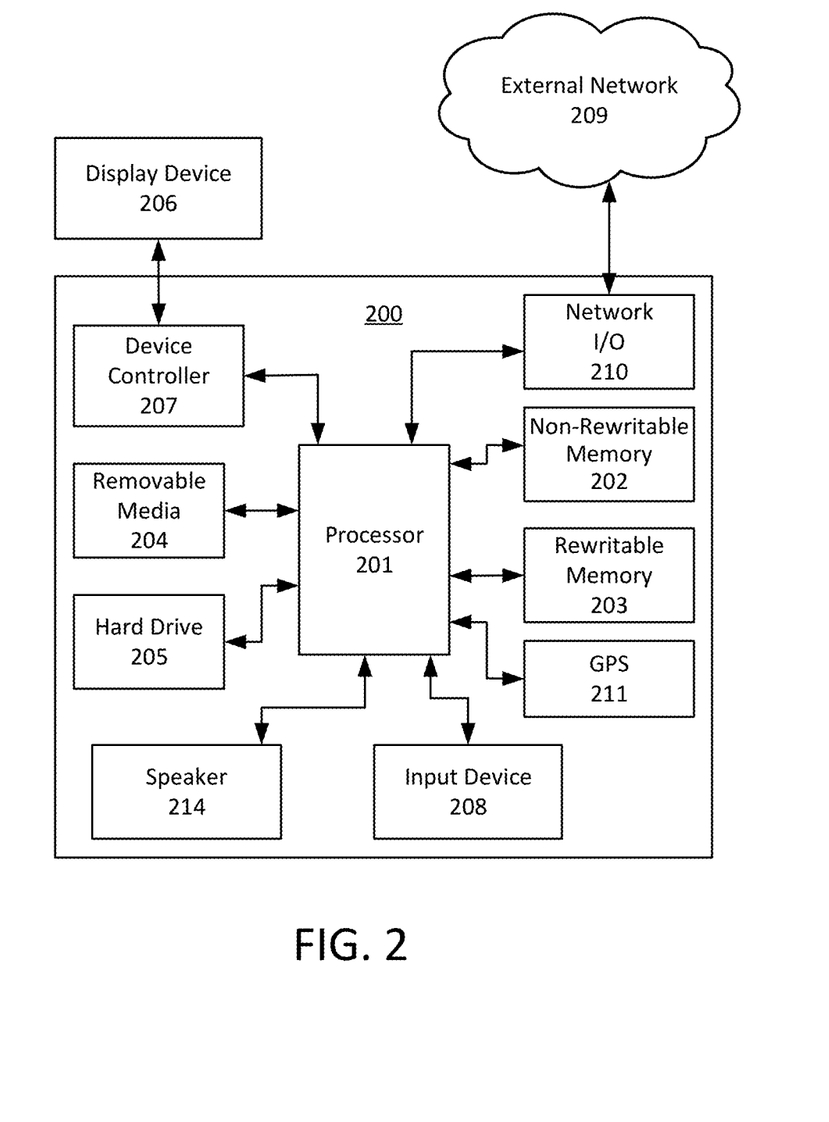
FIG. 2 shows hardware elements of a computing device.
Figure 3:
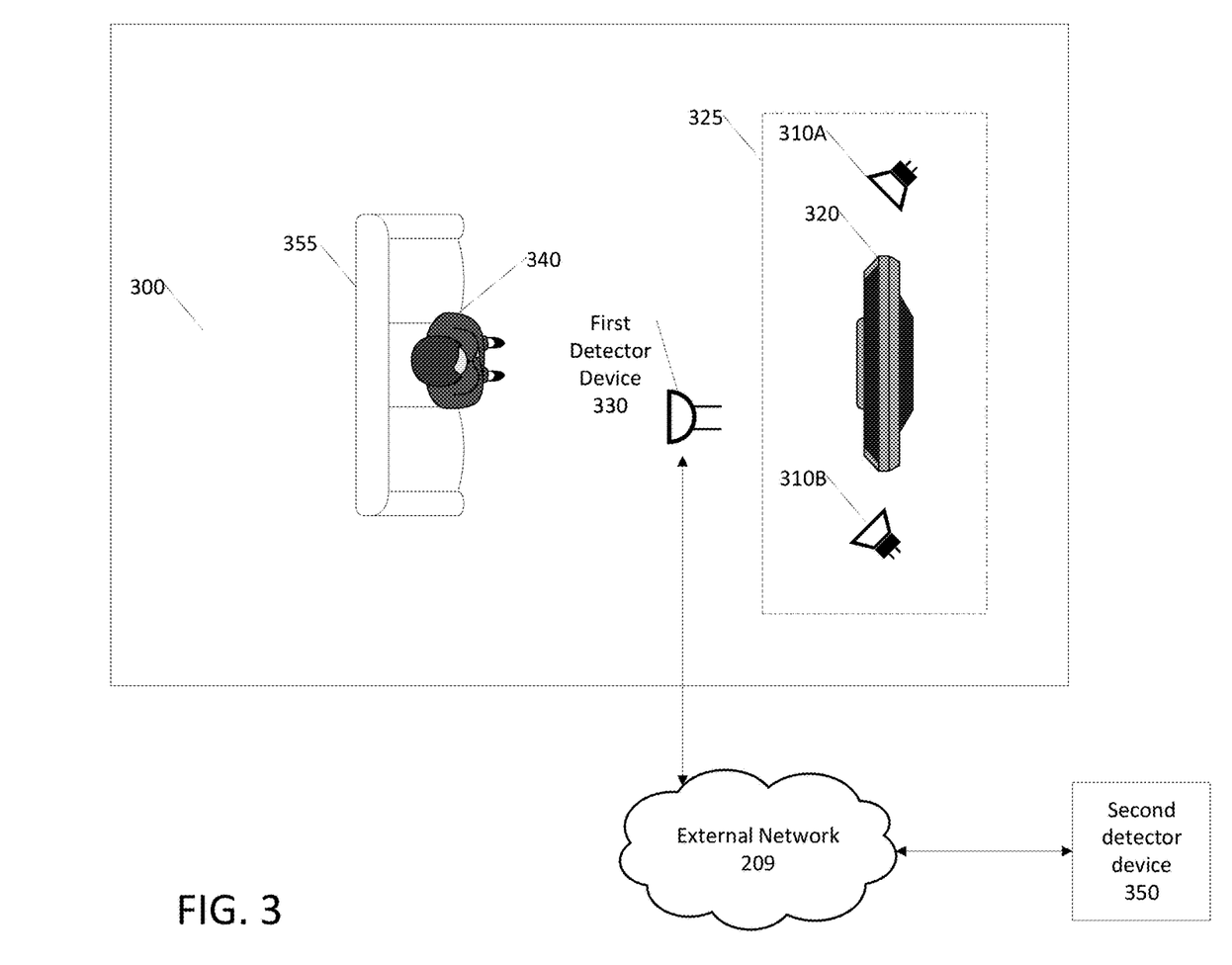
FIG. 3 shows an example system for keyword detection.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., the first detector device 330, the second detector device 350, and/or the output device 325 of FIG. 3). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more input/output device controllers 207, such as a video processor or a controller for an infra-red, RF4CE, or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

FIG. 3 shows an example system for keyword detection. An environment 300 may comprise an output device 325. The output device 325 may comprise one or more devices (e.g., a display 320 outputting video and/or speakers 310A-310B outputting audio). The one or more output devices 325 may comprise a display screen, television, tablet, smart phone, computer, or any other device capable of outputting audio and/or video of a content item. The environment 300 may comprise one or more locations such as a seating location 355 where a user 340 may view, listen to, or otherwise interact with the output device 325. Voice commands may be spoken anywhere in the environment, and do not need to be limited to commands relating to the output of content.

The environment 300 may comprise one or more detector devices. One skilled in the art would understand that a detector device may be any device suitable to receive and/or process commands, such as audio commands. A detector device may be a device configured to receive audio (e.g., using a microphone, beamformer, data transmission, etc.) and detect a keyword in the audio. One example of a detector device may be a network-connected device with a microphone that continually listens for consumer commands (e.g., a smart speaker). Another example of a detector device may be a computing device (e.g., a server) that receives audio samples from other devices (e.g., other detector devices) and processes those audio samples to determine the presence of a keyword in the audio.

A first detector device 330 may be configured to control the output device 325. The first detector device 330 may detect audio using one or more microphones (and/or one or more beams and/or a beamformer), send the audio to a second detector device 350 for determination of whether any command keywords were in the audio, and perform actions based on the keywords that were in the audio. The first detector device 330 may be a smart speaker, and the second detector device 350 may be a server. The first detector device 330 may receive an audio command from the user 340 to play a content item, adjust output of a content item, or otherwise control the output device 325. Sending the audio to the second detector device 350 may allow for the first detector device 330 to be of simpler design, but it may take a few moments before the first detector device 330 receives a confirmation from the second detector device 350 that a command keyword was in the audio. This may entail a small amount of time, such as one second. A one-second delay may not be important to many spoken commands, but some spoken commands may be adversely affected. For example, some spoken commands are wake words that alert the first detector device 330 that one or more additional words indicating a voice command will follow, and the system may wish to take some action based on the wake word. For example, the phrase "Hey Xfinity" may be used as a wake word to alert the first detector device 330 that a voice command will follow, and it may be helpful for the output device 325 to temporarily lower the volume of audio that is currently being output, so that the voice command following the wake word can be more clearly captured by the first detector device 330. The first detector device 330 may need to perform an operation, such as lowering audio output volume at the output device 325, based on the wake word. For example, a user may utter the phrase "Hey Xfinity, please record the movie," and the keyword "Hey Xfinity" can be detected by the first detector device 330, signaling to it that a voice command is intended. The phrase "please record the movie" may be sent to the second detector device 350 to be processed for commands that cause corresponding actions (e.g., "record" may cause a video recorder to schedule a recording, and "the movie" may cause the video recorder to search a schedule database to find the movie that the user is wishing to record). A keyword may comprise one or more words, phrases, syllables, or sounds. The first detector device 330 may send audio to the second detector device 350, for example, if the first detector device 330 did not detect a keyword in the audio (e.g., the first detector device 330 may confirm with the second detector device 350 that no keyword is in the audio). Alternatively, the first detector device 330 may send audio to the second detector device 350, for example, only if the first detector device 330 determined that a keyword was present in the audio.

The first detector device 330 may perform an action based on detecting a keyword. The action may enhance the ability of the first detector device 330 to receive or interpret a command that follows the keyword. For example, the first detector device 330 may detect spoken audio while a content item is being output from the output device 325, and may detect a keyword (e.g., a wake keyword) that indicates that one or more additional keywords will follow. The first detector device 330 may cause the output device 325 to adjust the audio (e.g., mute, lower the volume, etc.) based on detection of the wake keyword. By adjusting the audio, the first detector device 330 may be able to prevent audio from the output device 325 from interfering with the one or more additional command keywords that follow the wake keyword (e.g., the command spoken by the user 340). While many voice commands may deal with output of audio and/or video content, voice commands may be used to control other elements as well. Arming or disarming a security system, controlling a security system camera, adjusting a thermostat, accessing an Internet web page, an audible indication of microphone open/close, generating a prompt on a display of the output device 325, and any other desired type of home automation command may be given via voice command.

The first detector device 330 may comprise a microphone array that enables it to receive audio by detecting it. The microphone array may comprise a plurality of microphones (e.g., 2, 5, 15, or any other number of microphones). The first detector device 330 may use the microphone array to determine which direction a source of audio is located in relation to the first detector device 330. The first detector device 330 may determine features of the audio that may enable the first detector device 330 to determine whether the audio comprises a keyword. The first detector device 330 may determine a keyword confidence score that indicates whether a keyword was detected in the audio. The features and the keyword confidence score are discussed in more detail below in connection with FIG. 5.

The first detector device 330 may be configured to communicate with a second detector device 350 (e.g., via the external network 209), which may provide keyword detection support in the form of faster processing, larger database of detectable keywords, larger range of audio processing, etc. The first detector device 330 and the second detector device 350 may be physically separate. Alternatively, the first detector device 330 and the second detector device may be two processes running on the same machine, or they can be implemented on the same device. The second detector device 350 may comprise the keyword detector server 122. The first detector device 330 may communicate with the second detector device 350 to confirm one or more determinations made by the first detector device. For example, the first detector device 330 may send information to the second detector device 350 to confirm whether the first detector device 330 correctly detected a keyword in audio from the environment 300. The information sent to the second detector device 350 may comprise environment audio, features (e.g., signal to noise ratio, and/or other features as described herein) that the first detector device 330 determined using the environment audio, and/or a keyword confidence score. The second detector device 350 may use the information to determine whether the environment audio comprises a keyword. The second detector device 350 may have access to better and/or additional computing resources. The computing resources may allow it to determine whether a determination by the first detector device 330 is correct and/or whether any settings of the first detector device should be changed. The second detector device 350 may run on a more capable processor that can run a larger keyword detector model, which may be more robust than a smaller keyword detector model used by the first detector device 330. The tradeoff between false acceptance of keywords (e.g., detecting a keyword when no keyword was spoken by a user) and false rejection of keywords (e.g., failing to detect a keyword when a keyword was spoken by a user) may be better on the second detector device 350. For example, if both the first detector device 330 and the second detector device 350 are configured to minimize false keyword detection statistics, the second detector device 350 may achieve a lower false keyword detection rate than the first detector device 330. The second detector device 350 may be configured with a lower false keyword detection rate so it can reject false keyword detections made by the first detector device 330. Additionally, the second detector device 350 may be configured to determine how settings on the first detector device 330 should be changed to improve the keyword detection of the first detector device 330. The second detector device 350 may have access to more processing power, different speech recognition or keyword detection models, or may otherwise have better capabilities for detecting keywords or other commands from environment audio. The second detector device 350 may adjust one or more settings of the first detector device 330, for example, to improve the ability of the first detector device 330 to detect and/or interpret keywords and/or commands.

Figure 4:
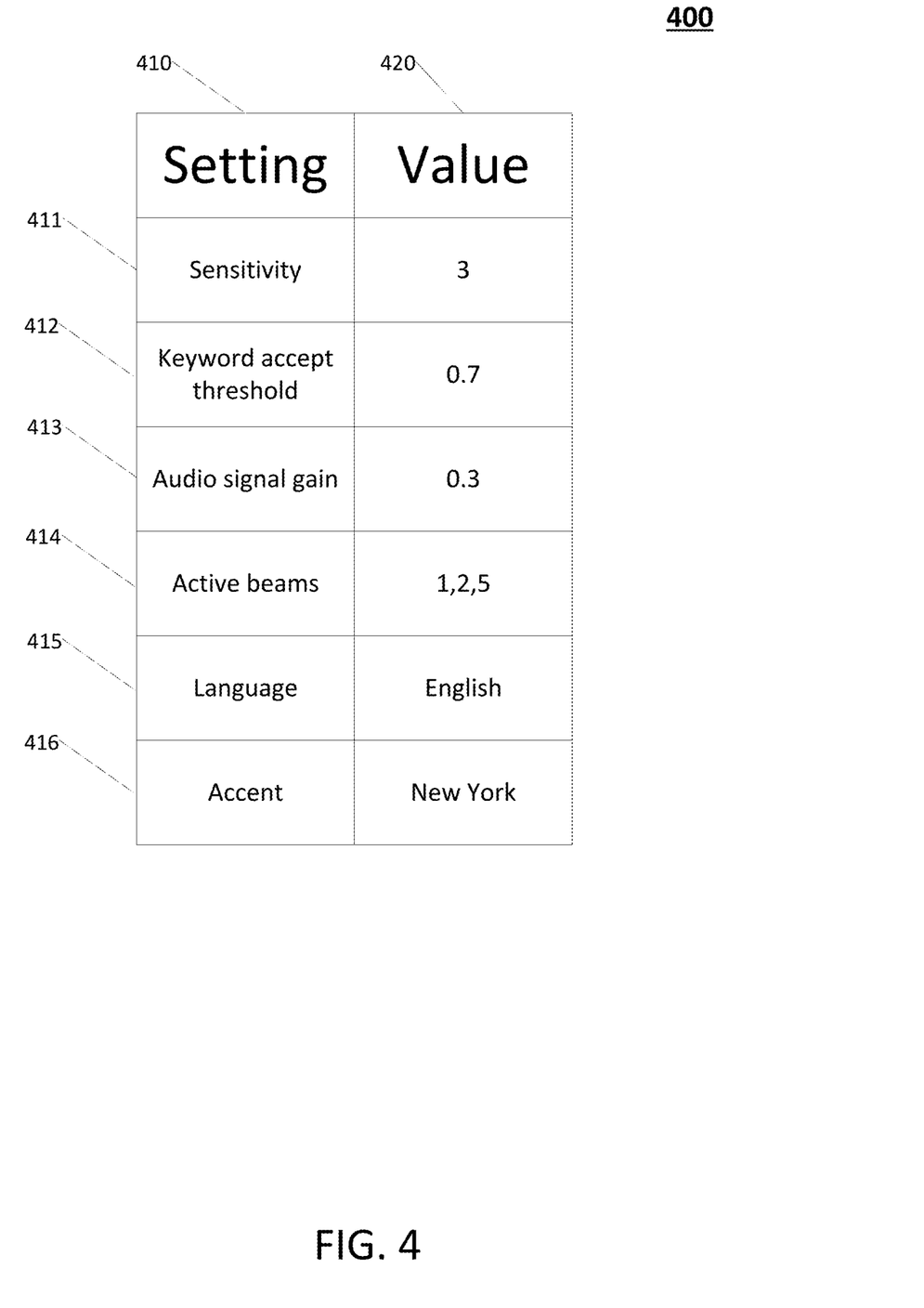
FIG. 4 shows example settings that may be adjusted for keyword detection.

FIG. 4 shows example settings that may be adjusted for keyword detection. The settings shown in FIG. 4 may be adjusted for the first detector device 330. The settings may be adjusted by the second detector device 350. Additionally or alternatively, the settings may be adjusted by a user or other computing device. A setting 410 may comprise sensitivity, keyword accept threshold, audio signal gain, active beams, language, accent, and/or other settings. Each setting may have an associated value 420 that may be adjusted.

The sensitivity setting 411 may indicate how easily the first detector device 330 will detect a keyword. For example, with a high sensitivity, it may be easier for the first detector device 330 to detect a keyword. Adjusting the sensitivity may cause a tradeoff between the probability of false acceptance of a keyword and the probability of false rejection of a keyword. Increasing the sensitivity may increase the probability of false acceptance and reduce the probability of false rejection. Decreasing the sensitivity may decrease the probability of false acceptance and increase the probability of false rejection. Various factors including background noise and distortion (e.g., signal to noise ratio), reverberation, accent, and others, may affect whether or not the detector will detect an actual keyword. Utterances using a specific accent may be more likely to be rejected even if the other characteristics like signal to noise ration are good. A keyword detector model used by the first detector device 330 may be trained with utterances with the specific accent to enable it to better detect keywords in the utterances. The keyword accept threshold setting 412 may indicate one or more confidence thresholds corresponding to keyword detection. For example, with a high threshold setting 412, the first detector device 330 may need to have a high confidence level that a keyword was detected before it will perform an action based on the keyword. For example, with a low threshold setting 412, the first detector device 330 may determine that a keyword was detected even with only low confidence in the detection. The first detector device 330 may extract features from the audio waveform and run those features through a machine learning model (e.g., a model that is designed to detect a specific keyword). The model may be pre-trained, such as by using a large corpus of keyword utterances (e.g., over a wide demographic) and/or under a variety of acoustic conditions. The first detector device 330 may compare the waveform of the audio detected by the first audio detector with a library of waveforms of valid keywords, and may determine how closely the detected audio waveform matches one or more valid keywords (e.g., through the use of a machine learning model for natural language processing). The detector 330 may generate a list of the "closest" matching waveforms in its library of valid commands, and for each match, it may generate a confidence value indicating how closely the waveforms matched.

The audio signal gain setting 413 may indicate an amount of amplification given to audio (e.g., environment audio) received by the first detector device 330. The dynamic range of input audio signal may be quite large due to differences in how loudly a person speaks. The first detector device 330 may also be a far-field device, which may also make the dynamic range of input audio signal large. For example, a person may speak a word when the person is a foot away from the first detector device 330 or 20 feet away from the first detector device 330. The first detector device 330 and/or the second detector device 350 may perform better (e.g., automatic speech recognition may perform better) when the audio signal of audio they receive is at a high level. Thus, the first detector device 330 may apply gain based on how strong a received audio signal is. For example, the gain setting may indicate that audio signals below a threshold signal level should be amplified. Additionally or alternatively, one or more microphones of the first detector device 330 may provide a larger dynamic range than is used by a software module. For example, one or more microphones may provide 24 bits of dynamic range but software modules or algorithms (e.g., Opus, Keyword Detector, and/or automatic speech recognition software modules) in the system may only accept 16-bit input. The gain setting may be used to make sure that audio signal received by one or more microphones is adjusted to work properly with the software modules and/or algorithms. Additionally or alternatively, the quantization noise in a low-level signal when using 24-bits of dynamic range for audio signal may be low. The dynamic range for the audio signal may need to be converted (e.g., from 24 bits to 16-bits). The audio signal gain setting may be adjusted to enable the conversion. If, for example, the upper 16 bits were taken from the 24-bits of dynamic range, the quantization noise would be increased because 8 bits of precision would be lost. If gain is applied to the audio signal prior to selecting the 16 bits, the dynamic range may be preserved.

One or more microphones in the first detector device 330 may be omnidirectional (e.g., the one or more microphones may receive audio from all directions with the same gain). Directionality may be determined using an acoustic beamformer, which may input multiple microphone signals. The beamformer may be implemented using software or hardware and may execute on or be otherwise included in the first detector device 330. The beamformer may form beams in one or more directions where the gain of a given beam is highest in a particular direction and the gain is lower in other directions. The first detector device 330 may comprise various microphone beams, which may be implemented for directional gain using a microphone and/or microphone array. The various beams may be on or off (e.g., active or inactive) to focus the detector device's attention on a particular direction." The active beams setting 414 may indicate which beams detected by the microphone array of the first detector device 330 are active (e.g., turned on, currently being used for detecting audio, etc.). The value corresponding to the active beams setting 414 may comprise a list of integers. Each integer in the corresponding value for the active beams setting 414 may indicate a corresponding beam in the microphone array that is active or inactive. For example, the active beams setting 414 may comprise a list of integers (e.g., 1, 2, 5) that indicates the first, second, and fifth beam detected by the microphone array are active. By setting some beams to active/inactive, the first detector device 330 may be able to better receive audio corresponding to valid keywords (e.g., keywords spoken by a user). The first detector device 330 may also eliminate or reduce interference in audio corresponding to a keyword by setting one or more beams inactive (e.g., a beam directed towards the output device 325).

The language setting 415 may indicate what language users associated with the first detector device 330 speak in the environment 300. The language setting 415 may indicate one or more language models (e.g., speech recognition models, etc.) used by the first detector device 330. The first detector device 330 may use any language model corresponding to any language (e.g., English, Spanish, French, German, Chinese, etc.). The accent setting 416 may indicate one or more accents associated with the spoken language of users associated with the first detector device 330. The accent setting 416 may indicate one or more language models (e.g., speech recognition models) used by the first detector device 330. For example, the accent setting 416 may indicate a speech recognition model that has been adjusted (e.g., trained) to recognize New York (e.g., Brooklyn), U.S. Southern, Boston, British, Irish, or any other accent. The speech recognition model may be trained on speech data specific to a particular region, city, neighborhood, family, or household so that it can better recognize speech. For example, the speech recognition model may be trained using speech data from a particular household to enable it to better recognize spoken language from members of the household.

Figure 5:
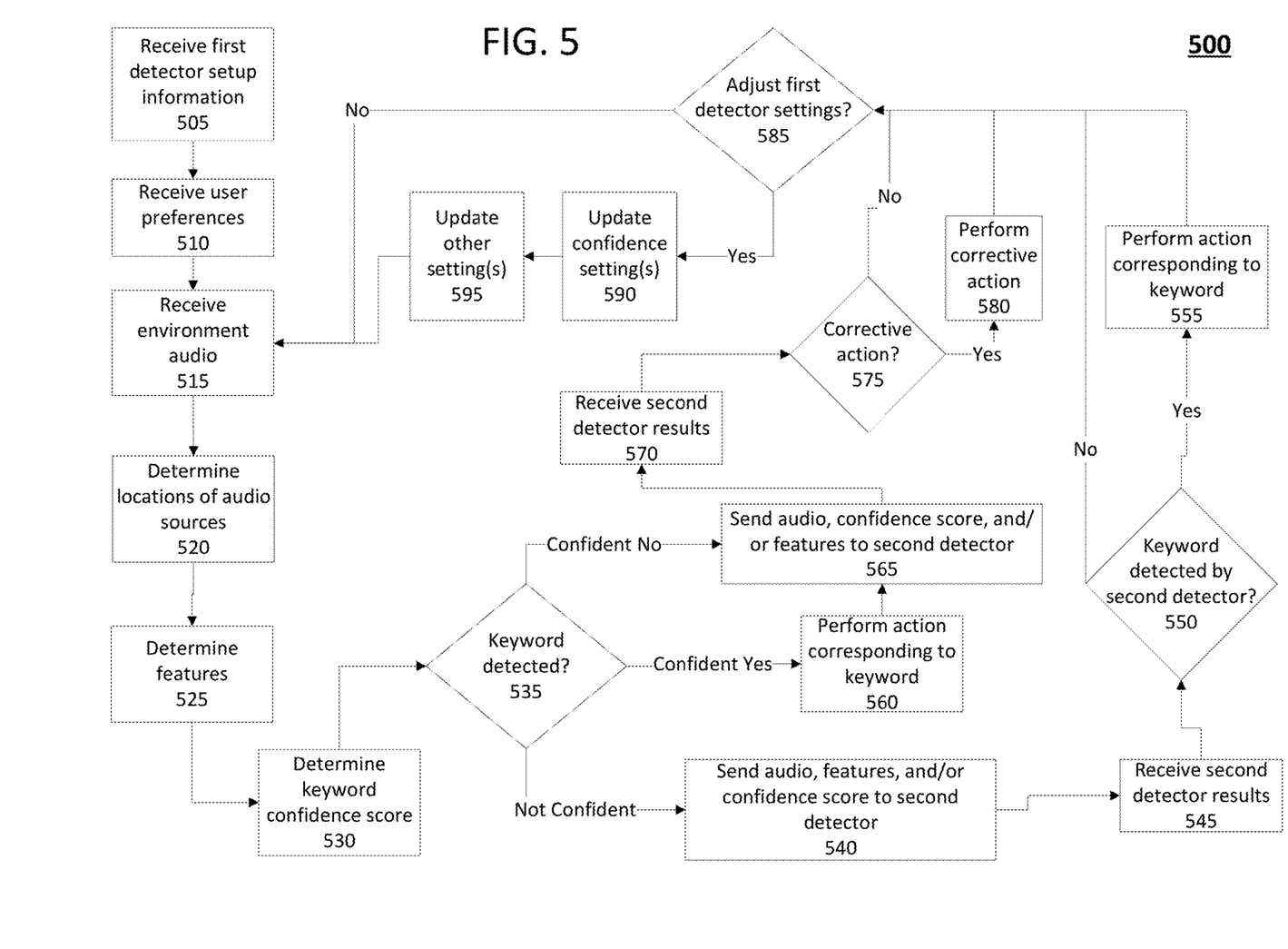
FIG. 5 is a flow chart showing an example method for keyword detection.

FIG. 5 shows an example method 500 for keyword detection. The example method 500 may be performed using any device described in connection with FIGS. 1-4. Although one or more steps of the example method of FIG. 5 are described for convenience as being performed by the first detector device 330, the second detector device 350, and/or the output device 325, one, some, or all of such steps may be performed by one or more other devices, and steps may be distributed among one or more devices, including any devices such as those described in connection with FIGS. 1-4. One or more steps of the example method of FIG. 5 may be rearranged, modified, repeated, and/or omitted.

At step 505, setup information may be received for the first detector device 330. For example, the first detector device 330 may receive a voice recognition model to enable it to recognize keywords and/or commands. The setup information may comprise information about the environment 300 in which the first detector device 330 is located. For example, the setup information may indicate what devices (e.g., the output device 325, or any other device) are located in the environment 300, and/or their locations in the environment 300. The setup information may indicate the size and/or dimensions of the environment 300. The setup information may comprise one or more thresholds as discussed in connection with FIG. 4 and/or in connection with steps 530-595 below.

At step 510, the first detector device 330 may receive viewing preferences of one or more users. The viewing preferences may indicate one or more preferred content items (e.g., a favorite show) of a user. The viewing preferences may indicate a genre that is preferred by the user (e.g., comedy, horror, action, etc.). The viewing preferences may indicate a category that is preferred by the user (e.g., reality TV, gameshow, etc.). Additionally or alternatively, the first detector device 330 may receive viewing history of one or more users. The viewing history may indicate what content items a user has viewed, when the user viewed each content item, and/or ratings the user has given to content items. The first detector device 330 may determine a user's preferences, for example, based on the viewing history of the user. The viewing preferences may be used to determine and/or adjust a threshold as discussed in further detail below, or to select a particular model (e.g., machine learning model) for use in keyword detection. For example, a machine learning model could be selected based on metadata indicating a particular show or search results.

At step 515, environment audio may be received. For example, the first detector device 330 may receive or detect audio within the environment 300. The received audio may comprise audio from one or more audio sources within the environment 300. The received audio may comprise audio from one or more audio sources outside of the environment 300. An audio source located outside the environment 300 may be detected by the first detector device 330. The first detector device 330 may ignore audio from the source located outside the environment 300. For example, if the environment 300 comprises a first room, and audio is detected coming from a second room (e.g., a user yells something from the second room), the first detector device 330 may determine to ignore the audio from the second room. The first detector device 330 may determine whether a sound came from another room, for example, by determining a distance between the audio source and the first detector device 330 (e.g., it may determine how far away the audio source is through triangulation using multiple microphones and comparing time of receipt at the different microphones, or other techniques). The first detector device 330 may compare the distance with the size and/or dimensions of the environment to determine whether the audio source is located inside or outside of the environment 300. The first detector device 330 may determine a distance or environment by analyzing signal characteristics (e.g., a reverberation of the signal). For example, if the distance is greater than a length of the environment 300, the first detector device may determine that the audio source is outside of the environment 300.

At step 520, locations of audio sources may be determined. The first detector device 330 may determine the location and/or direction of any audio source within the environment 300. The first detector device 330 may determine the location of one or more output devices, users, devices (e.g., kitchen appliances, computing devices, toys, or any other device), and/or any other audio source. The first detector device may determine the location of an audio source using audio received from the audio source. The location may comprise a direction from the first detector device 330, in which the audio source is located. The first detector device may use a microphone array and/or beamformer to determine from which direction audio from the audio source came. For example, the first detector device may determine that a television is at a particular location because it detects sounds corresponding to a content item coming from the location. Additionally or alternatively, the first detector device 330 may determine the location of an audio source by receiving location information of the audio source. The first detector device 330 may communicate with a device to receive location information (e.g., GPS coordinates) from the device, for example, if the device is an audio source. The first detector device 330 may determine locations of users within the environment 330, for example, based on location information received from devices associated with the users (e.g., mobile computing devices, wearable devices, etc.) cameras, motion sensors, or any other location-detecting device.

At step 525, features of the audio may be determined. The first detector device 330 may process the environment audio received in step 515 to determine one or more features from the audio. The features may comprise a noise floor. The noise floor may indicate a measure of the audio signal created from the sum of all of the audio signals that do not comprise a user's voice (e.g., noise from appliances, noise from heating ventilation and air conditioning equipment, or other sources that are not a human voice). The features may comprise a signal to noise ratio in the environment 300. For example, the signal to noise ratio may indicate the ratio of the strength of the audio signal coming from a user's voice compared to other audio sources. The features may comprise an average level of noise in the environment 300. The average of the noise in the environment 300 may comprise an average signal level of a number (e.g., 5, 50, 200, etc.) of measurements of audio signal in the environment 300. The features may comprise a level of reverberation of audio in the environment 300.

The features may comprise a signal level of the output device 325. The signal level of the output device 325 may indicate a volume level of the output device 325. The first detector device 330 may determine the volume level of the output device by detecting audio output from the output device and measuring how loud the audio output is. Additionally or alternatively, the first detector device 330 may be configured to communicate with the output device 325 (e.g., via Bluetooth, Wi-Fi, 5G, or other signal) and the output device 325 may send, to the first detector device 330, information indicating the volume with which the output device 325 is outputting audio. The features may comprise an indication of whether the output device 325 is on or off. The first detector device 330 may determine that the output device 325 is on, for example, if the first detector device 330 is able to detect audio from the output device 325. The first detector device 330 may determine that the output device 325 is off, for example, if the first detector device 330 is unable to detect audio from the output device 325. Additionally or alternatively, the first detector device 330 may receive information from the output device 325 indicating whether the output device 325 has been turned on or off. The features may comprise an indication of whether the output device 325 is currently outputting a content item or not. The first detector device 330 may determine that a content item is being output, for example, if it detects audio output from the output device 325. The first detector device 330 may receive audio files corresponding to content items (e.g., via an Internet connection) and may compare the audio files with the detected audio. If the detected audio matches audio in an audio file, the first detector device 330 may determine that a content item is being output. The features may comprise an identification of a content item being output from the output device 325. The first detector device 330 may determine a show or movie that is being output. For example, the first detector device 330 may determine a content item by comparing detected audio with one or more audio files. If the detected audio matches the audio in an audio file the first detector device 330 may determine that the content item corresponding to the audio file is being output by the output device 325. The first detector device 330 may determine any information about the content item that is being output. For example, an audio file corresponding to the content item may comprise information about the content item. For example, the information may comprise a title, length (e.g., running time), location within the content item that corresponds to what is currently output from the output device 325, etc. The first detector device 330 may determine when the content item was created (e.g., whether the content item is a rerun, whether the content item is a new episode, the release date of the content item, etc.). For example, the first detector device 330 may determine the title of a content item and may search the Internet for additional information about the content item such as the release date of the content item. Additionally or alternatively, the first detector device 330 may determine whether the content item being output from the output device 330 is a preferred content item based on a comparison with the user preferences received in step 510. The information about the content item may be used to adjust a threshold used for detecting a keyword as discussed in further detail below.

Information indicative of one or more features may be received from a user device. For example, the features may comprise information about users within the environment 300. The information may be received from a user via a user device associated with the user (e.g., the user's mobile device). The information may identify users who view content items in the environment. The information may indicate age, gender, occupation, location, viewing preferences, or any other information about one or more users. The features may indicate whether children are viewing a content item. For example, a cartoon may have a lower threshold, as it may be that a viewer may be more likely to be a child, and audio detection may be more difficult with child speech patterns. The information may indicate whether there are users above an age threshold (e.g., over the age of 65, etc.). The information may indicate one or more accents associated with one or more users. For example, if content is in a foreign language, threshold or models may be altered or selected as the viewers of content may speak in a different language or a particular accent.

The features may comprise speech data received from a user. The speech data may include one or more keywords and/or one or more commands. The first detector device 330 may use speech recognition (e.g., a machine learning model or other speech recognition model) to determine words contained in the speech data. The first detector device 330 may identify one or more potential keywords in the speech data. The features may comprise the one or more identified potential keywords.

The features may comprise an indication of a change in volume of the output device 325 (e.g., a change in volume caused by a user). For example, the first detector device 330 may take a first volume measurement of audio detected and then take a second volume measurement of audio from the output device 325. The first detector device 330 may compare the first volume measurement with the second volume measurement. The first detector device 330 may use the change in volume to determine whether a threshold for determining whether a keyword was detected should be changed. For example, if the volume of the output device 325 is increased the first detector device 330 may adjust the threshold to make it more likely for a keyword to be detected. With a higher volume it may become more difficult to detect a keyword. By adjusting the threshold, the first detector device 330 may be able to more easily detect a keyword, despite the increase in volume. The features may comprise long-term observations. For example, the features may comprise the average volume level of the environment 300 or output device 325 over a period of time (e.g., a month, a quarter, a year, etc.). The first detector device 330 may measure the volume level of the output device 325 periodically (e.g., 3 times a day, once per hour, etc.) and may take an average of the measurements to determine an average volume level of the environment 300.

The features may comprise locations of audio sources (e.g., as described above in step 520). The features may indicate a location of one or more users that are viewing and/or listening to a content item being output from the output device 325. The first detector device 330 may determine locations of one or more users, for example, based on the direction from which the one or more users' voice is received (e.g., the first detector device 330 may use microphone beamforming). For example, the first detector device may use a microphone array to detect that the voice signal received at a particular microphone and/or beam of the microphone array is stronger than other microphones and/or beams. The first detector device 330 may determine that the location of the source of the voice is in the direction to which the microphone and/or beam points. The first detector device 330 may determine, for example based on detecting audio of a user's voice, that the user is located on a couch facing the output device 325. Additionally or alternatively, the first detector device 330 may communicate with a mobile computing device associated with the user, and may receive location information (e.g., GPS data) indicating the location of the user. The features may indicate that a location of an audio source has changed. For example, the features may indicate that a user has moved from a first location (e.g., a couch in front of the output device 325) to another location (e.g., a chair to the side of the output device 325).

The features may comprise spectral characteristics. The spectral characteristics may comprise Mel Frequency Cepstral Coefficients (MFCC). At equally spaced intervals (e.g., 20 milliseconds) the MFCCs may be determined (e.g., by the first detector device 330). A sequence of MFCCs may be compared to sets of stored MFCC sequences that correspond to various pronunciations of one or more keywords. The keyword confidence score (e.g., described in more detail in connection with step 530 below) may be a reflection of how close (e.g., using Euclidean distance) the determined MFCCs are to the closest matching stored MFCC sequences.

At step 530, a keyword confidence score may be determined for any keywords that were detected. The first detector device 330 may determine a keyword confidence score based on the environment audio received in step 515 and/or the features determined in step 525. The first detector device 330 may use the environment audio and/or features as input into a machine learning model (e.g., a neural network or other machine learning model) to determine a confidence score for one or more keywords that may be present in the environment audio. Alternatively, the keyword confidence score may indicate one or more features described in step 525 (e.g., the keyword confidence score may indicate the signal to noise ratio). The keyword confidence score may indicate how certain the first detector device 330 is that a keyword has been detected. The first detector device 330 may determine multiple keyword confidence scores. Each confidence score may correspond to different keywords. For example, multiple keyword confidence scores may be determined for a single word detected in the environment audio, which may occur if there is some ambiguity as to which word was actually intended by the user. Each confidence score may correspond to a different possible keyword. The keyword confidence score may comprise a prediction of whether the second detector device 350 will determine (e.g., based on the environment audio received in step 515 and/or the features determined in step 525) that the environment audio comprises a keyword (e.g., a prediction of whether the second detector device 350 will recognize a keyword in the environment audio). Additionally or alternatively, a plurality of keyword confidence scores may comprise a separate keyword confidence score for each beam of the microphone array of the first detector device 330. The highest keyword confidence score of the plurality of keyword confidence scores may be used to determine whether a keyword was detected (e.g., in step 535). Alternatively, an average of the plurality of keyword confidence scores may be used to determine whether a keyword was detected (e.g., in step 535). A higher keyword confidence score may indicate a higher degree of confidence that the associated keyword was detected in the audio, or a stronger match between the audio and a valid keyword. The keyword confidence score may be represented in any desired way, with higher numbers indicating higher confidence, lower numbers indicating higher confidence, etc. The keywords being detected may be keywords that, if spoken, have need for immediate action. For example, wake words may preface a spoken command, and after a wake word is detected, it may be desirable to temporarily lower the volume of audio being output so that the spoken command following the wake word may be more clearly heard by the first detector 330. However, lowering the volume in that situation needs to be handled quickly, since there might not be much time between the wake word and the actual spoken command. In such situations, if the first detector device 330 is confident that it has detected a wake word, it may take immediate action to lower the volume so that the rest of the spoken command can be clearly recorded and sent to the second detector device 350, without waiting for the second detector device 350 to confirm that the wake word was spoken. By taking such immediate action, the first detector device 330 may provide a clearer recording for automatic speech recognition (e.g., executing on the first detector device 330 and/or the second detector device 350) to process. The first detector device 330 may be configured to only detect wake words (and/or only keywords that require immediate response).

Alternatively, the first detector device 330 may be configured to detect both wake words (and words requiring an immediate response) and other words that do not require an immediate response, and the first detector device 330 may determine to take immediate action (without waiting for the second detector device 350) only if a wake word (or other keyword requiring immediate response) is detected. Other keywords may be recognized by the first detector device 330 (e.g., a keyword command to schedule a future recording of a television program), but if the corresponding action (e.g., scheduling the recording) can afford to wait the short amount of time needed for the second detector device 350 to provide its analysis and results, then the first detector device 330 may simply await the response from the second detector device 350 before taking action on the keyword. The setup information received in step 505 may include information identifying wake words and other keywords that are to be detected and acted on by the first detector device 330 without waiting for the second detector device 350. This setup information may be modified. For example, if network conditions cause an increase in latency in communications with the second detector device 350, then some keyword commands may be added to the setup information, to cause the first detector device 330 to act on more words than originally planned. For example, if a one-second delay is normally acceptable for reacting to a "volume up" command, and it normally takes one second to receive a response from the second detector device 350, then the initial setup information may cause the first detector device 330 to simply let the second detector device 350 handle the detection of that command. However, if network conditions change, and the expected (or monitored) response time from the second detector device 350 increases to more than one second, then the "volume up" command may be added to the setup information, and the first detector device 330 may take immediate action if it confidently recognizes such a command.

At step 535, whether a keyword has been detected may be determined. For example, the first detector device 330 may determine whether it is confident that no keyword was detected, whether it is confident that a keyword was detected, and/or whether it is not confident that a keyword was detected. One or more thresholds may be used to determine whether a keyword has been detected. One or more thresholds may be used to determine whether the first detector device 330 is confident that a keyword has been detected or not detected.

The first detector device 330 may determine whether a keyword has been detected, for example, by comparing the keyword confidence score determined in step 530 with the one or more thresholds. For example, the one or more thresholds may comprise a high threshold and a low threshold. The first detector device 330 may determine that it is confident that the keyword was detected, for example, if the keyword confidence score satisfies the high threshold. The first detector device 330 device may determine that it is confident that the keyword was not detected, for example, if the keyword confidence score fails to satisfy the low threshold. The first detector device 330 may determine that it is not confident (e.g., it is not confident that no keyword was detected and it is not confident that a keyword was detected) for example, if the keyword confidence score satisfies the low threshold and fails to satisfy the high threshold. Step 560 may be performed, for example, if the first detector device 330 is confident that the keyword was detected. Step 565 may be performed for example, if the first detector device 330 is confident that a keyword was not detected. Step 540 may be performed, for example, if the first detector device 330 is not confident (e.g., the confidence score is between the low threshold and the high threshold). Table 1 below provides some examples of what the thresholds may be.

TABLE 1

| Example Number | Low Threshold | High Threshold |
|---|---|---|
| 1 | 0.1 | 0.9 |
| 2 | 0.3 | 0.95 |
| 3 | 0.3 | 0.8 |
| 4 | 0.4 | 0.7 |

If there was no confident 'yes' or 'no' determination, then at step 540, the environment audio received in step 515, the features determined in step 525, and/or the keyword confidence score determined in step 530 may be sent to the second detector device 350. The second detector device 350 may use the environment audio, features, and/or keyword confidence score to determine whether the environment audio received in step 515 comprises one or more keywords (e.g., as described above in connection with FIG. 3). For example, the first detector device 330 may send an estimated start time and end time for a wake word to the second detector device 350, which may aid the second detected device 350 in performing keyword detection. Additionally or alternatively, the second detector device 350 may use the environment audio, features, and/or keyword confidence score to determine whether settings of the first detector device 330 should be adjusted and/or how the settings should be adjusted (e.g., as described in connection with steps 585-595 below). The adjustments to settings of the first keyword detector 330 may be implemented on a long-term basis. For example, a keyword detector model used by the first detector device 330 may be retrained and/or updated periodically (e.g., every week, every three months, etc.).

At step 545, results may be received from the second detector device 350. The results may indicate whether the second detector device 350 detected a keyword in the environment audio. The results may indicate an action that should be performed based on the environment audio. For example, the results may indicate that the keyword was detected by the second detector device 350 and/or that the first detector device 330 should adjust the volume of the output device 325. The results may indicate that no action should be performed by the first detector device 330. For example, the results may indicate that no keyword was detected by the second detector device 350 and that the first detector device 330 should not adjust the volume of the output device 325.

At step 550, whether a keyword was detected by the second detector device 350 may be determined. For example, the first detector device 330 may determine whether a keyword was detected by the second detector 350 based on the results received in step 545. Step 585 may be performed, for example, if a keyword was not detected by the second detector device 350. Step 555 may be performed, for example, if a keyword was detected by the second keyword detector 350. At step 555, an action may be performed based on the keyword detected by the second detector device 350. For example, the first detector device 330 may cause the output device 325 to pause output of a content item, lower its volume, prompt a user to speak a command (e.g., by displaying a user interface on the output device 325, etc.), and/or mute its audio. The action may comprise displaying a microphone icon on a display screen (e.g., before results from the second keyword detector 350 are received). The action may comprise outputting an audible indication to the user to speak a command. The content item may be paused and/or the volume may be lowered temporarily. For example, the volume may be lowered for a time period (e.g., 2 seconds, 5 seconds, 10 seconds, or until the user has finished speaking a command, etc.) to allow the user to finish speaking the command, and to enable the first detector device 330 to better detect a command spoken by a user by having clearer audio.

If, in step 535, the confidence score determined in step 530 satisfies (e.g., meets or exceeds) a threshold (e.g., a high threshold shown in Table 1), then the process may proceed to step 560. At step 560, an action corresponding to a keyword determined in step 525 may be performed. For example, the first detector device may cause the output device 325 to lower its volume (e.g., mute the volume). The volume may be lowered temporarily. For example, the volume may be lowered for a time period (e.g., 2 seconds, 5 seconds, 10 seconds, etc.) to enable the first detector device 330 to better detect a command spoken by a user. For example, a user may speak a keyword and then speak a command. After detecting the keyword, the first detector device 330 may cause the volume of the output device 325 to be lowered (e.g., to reduce interference with the command) for the time period or the volume may be lowered until the first detector device 330 determines that the user has stopped talking (e.g., using end of speech detector). An end of speech detector may be located on the first detector device 330 and/or in the cloud (e.g., on the second detector device 350). After the time period has expired, the first detector device 330 may cause the volume of the output device 325 to return to its previous volume setting. Alternatively, a content item being output by the output device 325 may be paused temporarily. For example, after detecting the keyword, the first detector device 330 may cause the content item to be paused for the time period. After the time period has expired, the first detector device 330 may cause the output device 325 to resume output of the content item.

At step 565, the environment audio received in step 515, the features determined in step 525, and/or the keyword confidence score determined in step 530 may be sent to the second detector device 350. The second detector device 350 may use the environment audio, features, and/or keyword confidence score from the first detector device 330 as described above in connection with step 540 and/or in connection with FIG. 3. At step 570, results may be received from the second detector device 350 as described above in connection with step 545.

At step 575, whether a corrective action should be performed may be determined. A corrective action may be performed to correct a previous mistake made by the first detector device 330. For example, a corrective action may be performed because the first detector device 330 was incorrectly confident that no keyword was detected (e.g., in step 535) and/or because step 560 was not performed. Alternatively, a corrective action may be performed because the first detector device 330 was incorrectly confident that a keyword was detected (e.g., in step 535) and step 560 was performed. The first detector device 330 may compare the results received from the second detector 350 with the determinations made in step 530 and/or step 535 to determine whether corrective action should be taken.

The first detector device 330 may determine whether a corrective action should be taken, for example, based on whether it is too late for a corrective action to be taken. The first detector device 330 may compare a first time (e.g., a time at which the action was performed in step 560 or the time at which step 560 was skipped) with a second time (e.g., a time at which the second detector results were received). The comparison may be used to determine whether it is too late to take a corrective action. For example, if a difference between the second time and the first time satisfies a threshold (e.g., the time difference exceeds a threshold time), the first detector device 330 may determine that a corrective action should not be taken (e.g., it is too late to take a corrective action). For example, the period of time corresponding to a temporary pause of the content item or reduction in volume may have already elapsed and so it is too late to take a corrective action (e.g., because volume has already returned to normal). If a difference between the second time and the first time fails to satisfy a threshold (e.g., the time difference does not exceed a threshold time), the first detector device 330 may determine that corrective action should be taken (e.g., it is not too late to take corrective action). For example, the period of time corresponding to a temporary pause of the content item or reduction in volume may have not elapsed so it may benefit the user to undo the pausing or volume reduction. If it is determined that corrective action should be taken, step 580 may be performed. If it is determined that no corrective action should be taken, step 585 may be performed.

At step 580, one or more corrective actions may be performed. A corrective action may comprise adjusting the volume on the output device 330. For example, the first detector device 330 may cause the volume of the output device 325 to be lowered (e.g., lower the volume, mute the device, etc.). The first detector device 330 may cause the volume of the output device 325 to be lowered, for example, if the first detector device 330 incorrectly determined that no keyword was detected (e.g., in step 535). Alternatively, the first detector device 330 may cause the volume of the output device 325 to be raised (e.g., raise the volume, unmute the device, etc.). The first detector device 330 may cause the volume of the output device 325 to be raised, for example, if the first detector device 330 incorrectly determined that a keyword was detected (e.g., in step 535). A corrective action may comprise unpausing or pausing output of a content item. The first detector device 330 may cause output of a content item to be paused, for example, if the first detector device 330 incorrectly determined that no keyword was detected (e.g., in step 535). The first detector device 330 may cause output of a content item to be resumed (e.g., unpaused), for example, if the first detector device 330 incorrectly determined that a keyword was detected. A corrective action may comprise shortening the time period of a temporary pause or a temporary volume reduction. For example, if the first detector device 330 determines that a temporary volume reduction should not have occurred (e.g., the first detector device 330 incorrectly determined that a keyword was present in the audio), the first detector device 330 may cause the time period corresponding to the temporary volume reduction to be reduced (e.g., from a four second period to a one second period).

At step 585, it may be determined whether settings of the first detector device 330 should be adjusted. The first detector device 330 may determine whether settings should be adjusted, for example, based on results received in steps 570 and/or 545 (e.g., the results may indicate whether settings should be adjusted). The results received in steps 570 and/or 545 may comprise adjusted settings for the first detector device 330 to use. Making one or more adjustments may improve the ability of the first detector device 330 to determine whether a keyword is present in environment audio. The adjustments may be made, for example, if the first detector device 330 incorrectly determined that a keyword was detected or incorrectly determined that no keyword was present in environment audio (e.g., in step 535). The adjustments may be made, for example, if the first detector device 330 was not confident whether a keyword was detected in step 535. Step 590 may be performed, for example, if the results indicate that one or more settings should be adjusted. Step 515 may be performed, for example, if it is determined that one or more settings should not be adjusted.

At step 590, one or more confidence settings may be updated. For example, the one or more thresholds discussed in step 535 may be adjusted (e.g., raised or lowered). For example, the high threshold and/or low threshold may be raised or lowered by a value (e.g., 0.1, 0.2 or any other value). For example, it may be desired for the first detector device 330 to adjust the volume of audio of the output device 325 85% of the times that a valid keyword is detected. For example, the settings should be adjusted so that a confident yes, as described in connection with step 535 of FIG. 5, is determined by the first detector device 85% of the times that a valid keyword is actually present in the audio. The second detector device 350 may determine that, over time, the first detector device 330 is adjusting the volume of audio of the output device 325 only 75% of the time (e.g., by testing the model with labeled test data). The second detector device 350 may therefore adjust one or more thresholds by an amount determined to bring the volume adjustments closer to the desired 85% goal. The adjustments may continue over time. After more keyword detections (e.g., after more iterations of the method 500), the second detector device 330 may determine the rate at which the first detector device 330 is adjusting volume of the output device 325 when a keyword is detected. One or more thresholds may be lowered again, for example, if the second detector device 350 determines that the 85% goal has not been achieved. One or more thresholds may be raised, for example, if the second detector device 350 determines that the volume is adjusted more than 85% of the times that a keyword is detected.

A threshold may be adjusted based on feedback regarding false positives. For example, audio samples may be reviewed by human listeners to determine that a false positive has occurred. Based on that feedback, the threshold may be raised (e.g., to reduce hits due to false positives) or lowered (e.g., to encourage hits due to a low number of false positives). The feedback may also be used to retrain or alter a machine learning model, which may have the advantage of making the machine learning model more accurate over time. In some instances, one machine learning model may be used to supplement, or replace, the human listeners (e.g., a more advanced or computationally complex machine learning model may be used to train or alter another machine learning model), A threshold may be adjusted based on the content item that is being output in the environment 300. For example, the threshold may be adjusted so that the older the content item is (e.g., the more time that has passed since its release date) the more likely the threshold may be satisfied. This may make it less likely that a newer content item (e.g., a new release) is interrupted (e.g., by lowering the volume of the output device 325) than an older content item (e.g., a rerun). For example, a user may have a better user experience if newer content items are not interrupted (e.g., because the threshold is less likely to be satisfied). A user may have a better user experience if the user's commands are more easily interpreted by the first keyword detector 330 (e.g., because the threshold is more likely to be satisfied). A threshold may be adjusted based on preferences of a user viewing a content item. For example, the threshold may be adjusted so that the threshold is less likely to be satisfied if a content item is a preferred content item (e.g., favorite show) of the user. This may make it less likely for a user's preferred content item to be interrupted. For example, the threshold may be adjusted so that the threshold is less likely to be satisfied if a content item belongs to a category and/or genre in which the user is interested. This may make it less likely for an interruption to occur while a user is viewing a content item the user is interested in. The threshold may be adjusted based on a determination of how likely audio corresponding to a content item will comprise one or more keywords. For example, audio corresponding to an advertisement for a particular product may comprise one or more keywords (or may be determined to likely comprise one or more keywords). The settings of the first detector device 330 may be adjusted, based on the advertisement, to make it more difficult for a threshold to be satisfied (e.g., it may be less likely that step 560 will be performed). For example, the first detector device 330 may increase the high threshold for keyword detection (e.g., from 0.8 to 0.9). Additionally or alternatively, the first detector device may increase the low threshold (e.g., from 0.1 to 0.2) to make it less likely for step 560 to be performed.

A threshold may be adjusted based on a location of one or more audio sources detected by the first detector device 330. The first detector device may determine to adjust the threshold for users that are not in the room. For example, the first detector device 330 may determine that a potential keyword in the environment audio corresponds to a particular user's voice (e.g., using a machine learning model for voice recognition). The first detector device 330 may determine, for example, based on location information corresponding to the user, that the user is not located within the environment (e.g., the voice is detected coming from another room, the voice is detected as output coming from a smartphone, etc.). For example, the first detector device 330 may communicate with a mobile device of the user to receive the user's location. The first detector device 330 may compare the user's location with the location of the environment 300 to determine that the user is not located within the environment 300. The first detector device 330 may determine to adjust the threshold so that potential keywords that correspond to users that are not located within the environment are less likely to cause performance of an action (e.g., lowering the volume or any other action described in steps 560 or 555). For example, a first user may be on a phone call with a second user (e.g., the first and second user may live in a house that comprises the environment 300 but the second user may be away). The first detector device 330 may detect the voice of the second user on the phone call, but because the second user is not located in the environment, any potential keywords spoken by the second user may be ignored by the first computing device 330. For example, the threshold may be adjusted so that it is more difficult for audio corresponding to the second user to lead to an action described in step 560 (e.g., adjustment of volume of the output device 325).

A user may be more likely to speak a keyword when the output device is on and/or if the output device 325 is currently outputting a content item. The first detector device 330 may communicate with the output device 325 to determine whether the output device 325 is currently outputting a content item. A threshold may be adjusted based on whether the output device 325 is on or off. For example, a user may be more likely to say a keyword if the output device 325 is on because the user may want to control the output device 325. The threshold may be adjusted so that a keyword is more easily detected (e.g., by decreasing the high threshold) when the output device 325 is on. A threshold may be adjusted based on whether the output device 325 is currently outputting a content item or not. A threshold may be adjusted so that it is more difficult to satisfy, for example, if the output device 325 is off.

At step 595, other settings may be updated. For example, any of the settings described in connection with FIGS. 1-4 may be adjusted. The first detector device 330 may adjust the microphone array by turning one or more beams on or off or by otherwise adjusting the sensitivity of a beam in the microphone array. For example, the first detector device 330 may turn on a beam and/or turn off a beam of the microphone array. A beam may be turned off or on based on a change in location of the user and/or the output device 325. For example, a microphone array may comprise 10 beams. The output device 325 may located so that it is facing or is otherwise closest to beam 5. A user may move the output device 325 (and/or the first detector device 330) so that it is facing or is otherwise closest to beam 9. Based on the new location of the output device 325, the first detector device 330 may adjust (e.g., turn off) beam 9 and/or adjust (e.g., turn on) beam 5. By adjusting the microphone array, the first detector device may prevent (e.g., reduce the chance of) detecting a keyword in audio that is output from the audio output device 325. As an additional example, a user may be in a location that is facing or is otherwise closest to beam 4. The user may move to a new location that is facing or is otherwise closest to beam 1. The first detector device 330 may adjust the microphone array so that the microphone 1 is turned on and/or the microphone 4 is turned off, for example, based on the new location of the user. Alternatively, the first detector device 330 may be moved. One or more beams of the first detector device 330 may be adjusted, for example, based on a new location of the first detector device 330. For example, after moving to a new location, a beam corresponding to the location of the output device 325 may be turned off and/or a beam corresponding to the location of a user may be turned on.

The first detector device 330 may adjust a gain level. For example, the gain level may be adjusted if the second detector device 350 detects a keyword in the environment audio and the first detector device 330 failed to detect the keyword (e.g., because the environment audio was too quiet). Additionally or alternatively, the gain level may be adjusted, for example, based on the location of the user. For example, if the first detector device determines that the user is located greater than a threshold distance from the first detector device, then the gain level may be increased. Additionally or alternatively, the gain level may be adjusted, for example, based on a location of the output device 325. For example, if the output device 325 is within a threshold distance of the first detector device 330, the gain level of the first detector device 330 may be lowered.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
    determining, by a first detector, a confidence value associated with recognition of a voice command in audio;
    sending, to a second detector, a request to process the audio to recognize the voice command; and
    prior to receiving a response from the second detector indicating whether the voice command was recognized in the audio, and based on a comparison of the confidence value to a threshold, causing performance of the voice command.

2. The method of claim 1, further comprising:
    reducing an audio level of an audio output;
    detecting additional audio after the reducing the audio level of the audio output; and
    sending the additional audio to the second detector for processing the additional audio.

3. The method of claim 1, wherein the voice command comprises a wake keyword, and wherein the method further comprises temporarily lowering an audio volume while one or more additional keywords are spoken following the wake keyword.

4. The method of claim 1, further comprising:
    receiving an indication that the voice command was not recognized by the second detector; and
    based on the indication, causing a corrective action to reverse the performance of the voice command.

5. The method of claim 1, further comprising:
    receiving an indication that the voice command was not recognized by the second detector;
    determining that it is not too late to prevent performance of the voice command; and
    based on the indication and the determining that it is not too late, preventing performance of the voice command.

6. A method comprising:
    determining, by a first detector, based on received audio, and based on keyword detection settings of the first detector, a confidence score indicating whether a keyword has been detected;
    sending, to a second detector, the confidence score and the audio;
    prior to receiving a response from the second detector indicating whether the keyword was recognized in the audio, and based on determining that the confidence score satisfies a threshold, lowering a volume level of an output device for a time period;
    receiving, from the second detector, keyword detection information indicating whether the keyword was detected in the audio by the second detector; and
    causing, based on the keyword detection information received from the second detector, adjustment of the threshold.

7. The method of claim 6, further comprising adjusting, based on determining whether the output device is outputting content, the threshold.

8. The method of claim 6, wherein the keyword detection information indicates that the keyword was not detected in the audio by the second detector; and
    based on the indication, shortening the time period.

9. The method of claim 6, further comprising:
    determining, based on the audio, an indication of a change of location of the first detector with respect to the output device; and
    deactivating a beam corresponding to a location of the output device.

10. The method of claim 6, further comprising:
    determining, based on the audio, an indication of a location of a user and a location of the output device;

turning off a first beam of the first detector, wherein the first beam corresponds to the location of the output device; and turning on a second beam of the first detector, wherein the second beam corresponds to the location of the output device.

11. The method of claim 6, further comprising:

determining, based on the audio, that a user has moved from a first location to a second location;

turning off a first beam, of the first detector, corresponding to the first location; and turning on a second beam corresponding to the second location.

12. The method of claim 6, further comprising:

determining, based on the audio, that a rerun is being output on the output device; and adjusting the threshold to make the threshold more easily satisfied.

13. The method of claim 6, further comprising:

determining, based on the audio, that a user's preferred content item is being output via the output device; and based on the determining, making the threshold satisfied less easily.

14. The method of claim 6, further comprising:

determining that it is not too late to undo the lowering the volume level; and causing, based on the keyword detection information, the first detector to undo the lowering the volume level.

15. A method comprising:

receiving, by a first detector at a location, audio;

determining, based on the audio and keyword detection settings of the first detector, a confidence score indicating whether a keyword has been detected;

sending, to a second detector, the confidence score and the audio;

based on a comparison of the confidence score to a threshold, maintaining a volume level of a content item being output in the location; and receiving, from the second detector and after the maintaining the volume level, keyword detection information indicating whether the keyword was confirmed by the second detector.

16. The method of claim 15, further comprising:

determining, based on the keyword detection information, that the maintaining the volume level of the content item was a mistake; and based on the determining, lowering the volume level to permit completion of a spoken command.

17. The method of claim 15, further comprising:

determining, based on the audio, that the content item comprises a rerun; and based on the determining, adjusting the threshold to make the threshold more easily satisfied.

18. The method of claim 15, further comprising:

determining, based on the audio, that the content item comprises a user's preferred content item; and based on the determining, adjusting the threshold to make the threshold less easily satisfied.

19. The method of claim 15, further comprising:

determining, based on the audio, an indication of a change of location of the first detector with respect to an output device; and based on the determining, deactivating a beam corresponding to a location of the output device.

20. The method of claim 1, wherein the threshold indicates whether the first detector should wait for confirmation from the second detector before the performance of the voice command.

* * * * *